(No Model.)
J. L. BORSCH.
TEST FRAME AND TRIAL LENS FOR EYES.
No. 466,597. Patented Jan. 5, 1892.
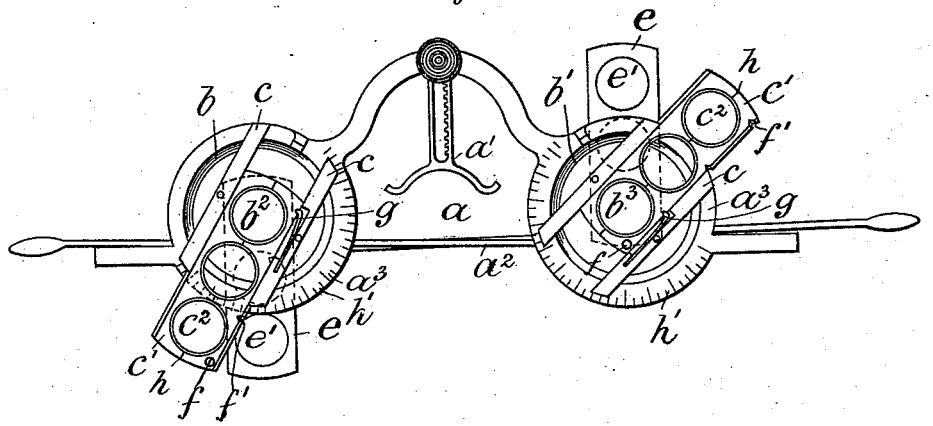
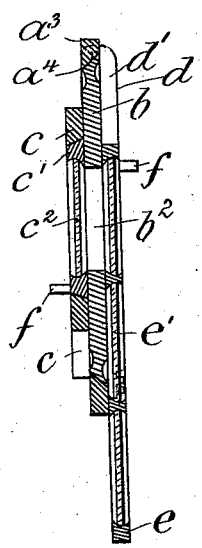
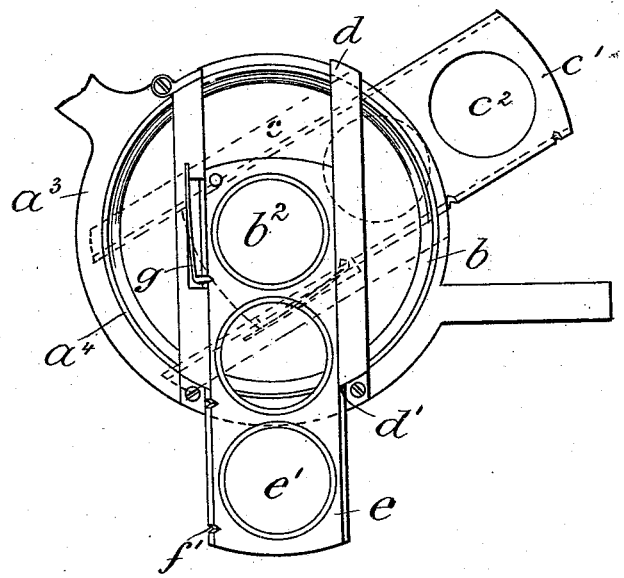
Witnesses:
Hermann Bormann
Thomas M. Smith
Inventor:
John L. Borsch
by Augustus B. Stoughton
att'y

UNITED STATES PATENT OFFICE.

JOHN L. BORSCH, OF PHILADELPHIA, PENNSYLVANIA.

TEST-FRAME AND TRIAL-LENS FOR EYES.

SPECIFICATION forming part of Letters Patent No. 466,597, dated January 5, 1892.

Application filed July 4, 1891. Serial No. 399,461. (No model.)

*To all whom it may concern:*

Be it known that I, JOHN L. BORSCH, a citizen of the United States, residing at the city of Philadelphia, in the county of Philadelphia and State of Pennsylvania, have invented certain new and useful Improvements in Test-Frames and in Trial-Lenses for Eyes, of which the following is a specification.

The principal objects of the present invention are, first, to provide a small, light, compact, and convenient trial apparatus for testing eyes; and, second, to so arrange the test-frame and trial-lenses of the test apparatus as that the same may be when not in use readily packed in a case of a size that is adapted to be conveniently carried in the pocket.

The present invention consists of the improvements hereinafter described, and pointed out in the claims.

The nature and characteristic features of the invention will be more fully understood from the following description, taken in connection with the accompanying drawings, forming part hereof, and in which—

Figure 1 is a front view of a test-frame provided with trial-lens slides and embodying features of my invention. Fig. 2 is an enlarged view of the right-hand portion of Fig. 1, and Fig. 3 is a central section of Fig. 2.

In the drawings, $a$ is a test-frame provided with an adjustable bridge $a'$, temples $a^2$, and bows $a^3$, and adapted to be placed in front of the eyes in the usual manner.

Having thus briefly indicated the parts of one of the many types of test-frames to which my improvement is applicable, I will now proceed to describe the improvement itself.

The interior edges of the bows $a^3$ are chamfered, as at $a^4$, to form seats for the reception of disks $b$ and $b'$, provided, respectively, with central apertures $b^2$ and $b^3$. These disks $b$ and $b'$ are provided with chamfered edges adapted to engage the chamfered edges of the bows $a^3$, and are retained to place in the bows $a^3$ by means of rods $c$, attached to the disks and having their extremities in engagement with the bows $a^3$, so that the disks $b$ and $b'$ may be freely rotated with reference to the frame $a$. The interior edges of the rods $c$ are beveled to form ways adapted for the reception of a slide $c'$, provided with trial-lenses $c^2$.

$d$ are rods attached to the bows $a^3$ and having beveled edges $d'$, forming ways for the reception of slides $e$, provided with trial-lenses $e'$. These slides $c'$ and $e$ may be provided with a pin $f$ for shifting them in the ways, and also with recesses $f'$.

$g$ are spring-detents adapted to enter the recesses $f'$ whenever the lenses of the slides are brought opposite to the central apertures of the rotary disks, the object being to insure the proper adjustment of the lenses in front of the pupils of the eyes.

The degree of rotation of the disks $b$ and $b'$ may be readily ascertained by means of the indexes $h$ and scales $h'$.

The mode of operation of the hereinabove-described apparatus is as follows: Use is made of a series of slides $e$, provided, respectively, with several spherical test-lenses $e'$. These slides are inserted one after another into the ways formed by the rods $d$, and are slid in said ways by means of the pin $f$ or in any other preferred manner until the proper test of the eye has been completed, it being understood that the detent $g$ and recesses $f'$ serve to insure the bringing of each lens directly in front of the eye. A series of slides $c'$, provided, respectively, with several cylindrical lenses, are inserted one after another into the ways formed by the rods $c$, and these lenses $c^2$ are brought in front of the eyes by means of the pins $f$ and detents $g$ in the manner above described. Moreover, each cylindrical lens may be rotated in front of the eye by the simple operation of turning the rotatable disks $b$ and $b'$, and the degree of inclination of each of the lenses may be noted by means of the indexes $h$ and scales $h'$ until the test of the eyes has been completed.

Of course the slides $c'$ and $e$ may be used separately or together, as required.

Having thus described the nature and objects of my present invention, what I claim as new, and desire to secure by Letters Patent, is—

1. The combination, in an apparatus for testing the eyesight, of a test-frame provided with a nose-bridge and temples and bows, centrally-perforated disks rotatably mounted in said bows and provided with ways, and test-lens slides working in said ways, substantially as and for the purposes set forth.

2. The combination, in an apparatus for testing the eyesight, of a test-frame provided with a nose-bridge and temples and bows, centrally-perforated disks rotatably mounted in said bows and provided with ways, rods attached to said bows and provided with ways, and two series of test-lens slides, whereof one works in the ways on said disks and the other in the ways on said rods, substantially as and for the purposes set forth.

In witness whereof I have hereunto subscribed my name in the presence of two witnesses.

JOHN L. BORSCH.

Witnesses:
A. B. STOUGHTON,
HERMANN BORMANN.